United States Patent

[11] 3,584,136

[72] Inventor Donald E. Robert
 3123 Robin Road, Decatur, Ga. 30032
[21] Appl. No. 830,379
[22] Filed June 4, 1969
[45] Patented June 8, 1971

[54] ELECTRICAL PANEL BOX
 6 Claims, 5 Drawing Figs.
[52] U.S. Cl. .................................................. 174/53,
 220/3.94
[51] Int. Cl. ...................................................... H02g 3/12
[50] Field of Search ............................................ 220/3.92,
 3.94, 4; 174/65, 53, 48, 49

[56] References Cited
 UNITED STATES PATENTS
 1,056,584 3/1913 Rosenkranz .................. 220/3.94

Primary Examiner—Lewis H. Myers
Assistant Examiner—D. A. Tone
Attorneys—Clarence A. O'Brien and Harvey B. Jacobson ABSTRACT: An open-front electrical box constructed to facilitate installation of electrical wiring in compliance with recognized codes and acceptable to inspectors of power companies in keeping with the job requirements of electricians. It is constructed to aid electricians when wiring, rewiring or replacing a panel, junction or outlet box of a type which is built in or sealed on all of its sides. The top and bottom end walls can be removed and/or pivoted to a position which will enable free access to be had to the space between building walls and to expedite handling electrical cables, wires and rigid conduits used in industrial installations without damage to the room walls.

PATENTED JUN 8 1971

3,584,136

Donald E. Robert
INVENTOR.

BY *Clarence A. O'Brien*
*and Harvey B. Jacobson*
Attorneys

ELECTRICAL PANEL BOX

This invention relates to boxes and housings for electrical use, that is, boxes which are referred to, generally stated, as junction boxes, outlet boxes and, more specifically, electrical panel-type boxes which when properly installed in a room wall often pose a problem for workmen and particularly the electrician who is called upon to handle electrical installation requirements.

Briefly the herein disclosed electrician's box is of a composite type. The box is preferably open at its front and embodies a vertical backwall provided along opposite vertical edges with duplicate forwardly laterally projecting spaced parallel sidewalls and correspondingly projecting top and bottom end walls. Certain of the walls, all of the walls if desired, have normally intact selectively usable knockout plugs which provide openings for passage of insertable and removable current-conducting cables or, alternatively, to accommodatingly receive and mount cable entrance or adapting bushings or fittings. At least one of the end walls, usually both end walls, is movably mounted and retractable to assume a retracted out-of-the-way position within the confines of the receptacle portion of the box when necessary or desired for expedient cable and wiring installation steps.

In carrying out the principles of the invention the vertical sidewalls are provided at their respective upper and lower end portions with lateral turned-in flanges. The flanges at the respective end portions are paired and in a common plane, are relatively narrow, define cable-accommodating access openings between themselves and also provide seating abutments for coacting end portions of the cooperating end walls. Accordingly, the end walls span the space between and are normally seated on the coacting abutments and provide manually openable and closable closures for said access openings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
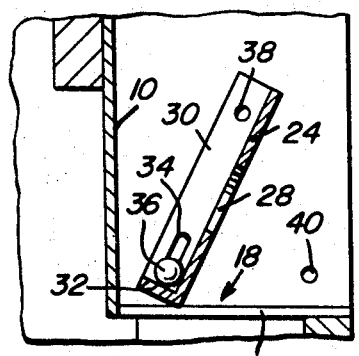
FIG. 3 is a fragmentary detail section of the lower portion only of the box appearing in FIGS. 1 and 2 and which shows in greater detail the headed pin and slot hinging means for the openable and closable bottom end wall.
Figure 4:
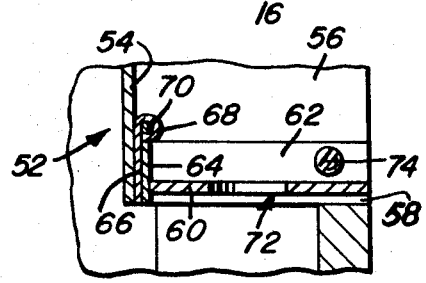
FIG. 4 is a view similar to FIG. 3 but showing a modified bottom end wall, more particularly, the means whereby said end wall is joined by hinge means to the interior of the lower portion of the backwall of the box.
Figure 5:
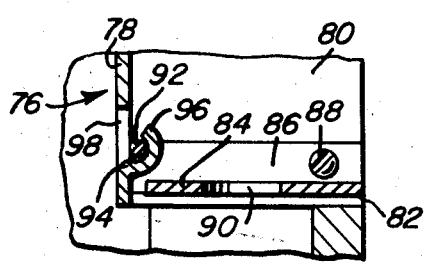

And FIG. 5 is also a view similar to FIGS. 3 and 4 and showing a third form or embodiment wherein the bottom end wall is fastened in a closed position but is joined to the backwall of the box by hinge means differing from that appearing in FIGS. 3 and 4.

Figure 1:
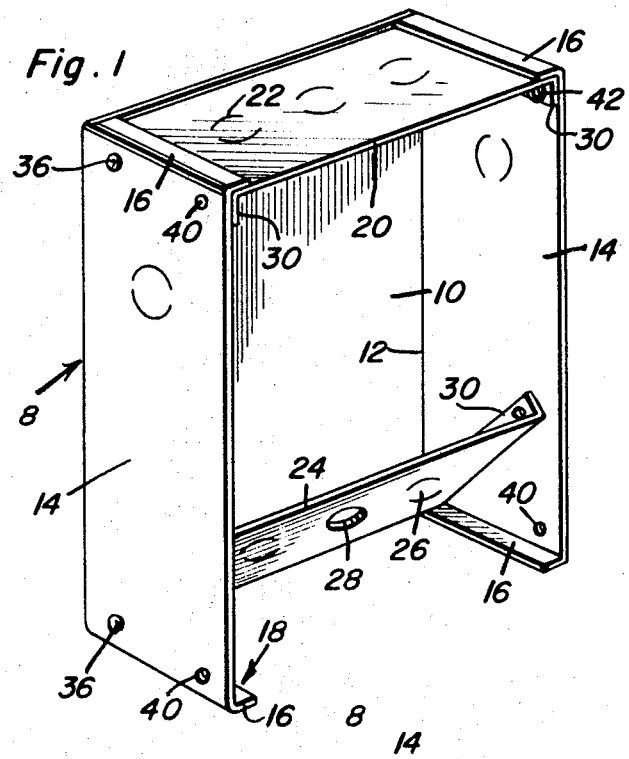
FIG. 1 is a view in perspective of an electrical panel box constructed in accordance with the principles of the present invention and showing the upper end wall closed and fastened and the lower end wall swung or tilted up to an open position.
Figure 2:
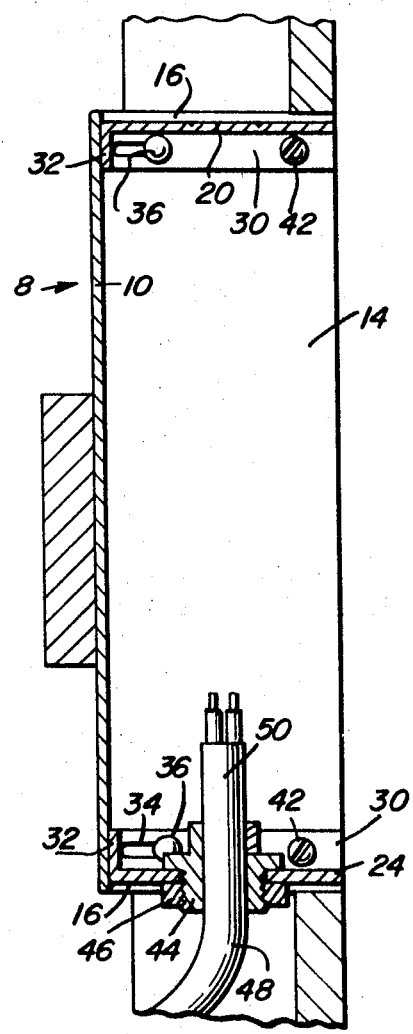
FIG. 2 is a view on an enlarged scale showing the box installed in a room or an equivalent wall and wherein both top and bottom end walls are fastened in closed position and wherein the bottom end wall is provided with a cable entrance fitting with a cable end installed therein and projecting into the receptacle portion of the box.

With reference to FIGS. 1 to 3 of the drawing it will be seen that the improved electrical panel box is denoted, generally stated, by the numeral 8. This box is made of suitable sheet material and the box proper is U-shaped in cross section and vertically elongated when installed in the manner shown in FIG. 2. This box is characterized by a flat inward or backwall 10 provided along vertical marginal edge portions 12 with outstanding spaced parallel vertically disposed sidewalls 14. The upper and lower end portions are provided with paired coplanar turned-in horizontal flanges 16 which serve as limit stops and also abutments. These flanges are relatively narrow as shown in FIG. 1 and define an access opening 18 between themselves. These thus flanged sidewalls serve to accommodate the upper and lower or top and bottom end walls. The top end wall is denoted at 20 and is provided with knockout plugs 22. The correspondingly constructed bottom or lower end wall is denoted at 24 and is provided also with selectively usable knockout plugs 26 one of which is shown removed to provide a cable opening as at 28. Both top and bottom end walls are the same in construction and purpose and each wall is of the construction perhaps best shown in FIG. 3 wherein it will be noted that lateral upstanding end flanges are provided at 30 and an inward longitudinal flange is provided at 32. The end flanges are provided with slots 34 which are slidingly and hingedly mounted on headed pivot pins 36 carried by suitable lower end portions of the sidewalls 14. These end flanges are also provided with holes as at 38 which register with similar holes 40 and which holes when lined up serve to accommodate the screw-threaded headed fastening means 42 shown in FIG. 2. When the wall is closed it is seated on the abutment ledges or flanges 16. The entrance cable fitting shown in FIG. 2 comprises a bushing 44 fitted in the hole 28 provided therefor and held in place by an assembling nut 46. This bushing serves to accommodate a cable 48 whose projecting end portion 50 is fitted into the receptacle portion of the box.

The manner in which the box of FIGS. 1 to 3 is constructed, installed and used is believed to be self-evident and a more explicit description thereof is deemed to be unnecessary.

In the form of the invention shown in FIG. 4 the box proper is denoted by the numeral 52, the backwall at 54 and sidewalls at 56. The ledgelike flanges or abutments are denoted at 58 and the movable bottom end wall is denoted at 60. The transverse and longitudinal flanges are denoted at 62 and 64, the flange 64 constituting a part of the hinging means. The other part or leaf of the hinge is denoted at 66 and has knuckles 68 hinged on the pintle 70 in the manner shown. It will be evident from FIG. 4 that the end wall 60 corresponds to the aforementioned hingedly mounted end wall 24. It will be further evident that it provides a closure for the opening means 72 existing between the seating and abutment flanges 58. The fastening means is referred to here by the numeral 74 and corresponds to that shown and described in detail in FIGS. 1 to 3 inclusive. By removing the readily accessible fastening means 74 the bottom or lower end wall 60 can be swung up from the closed position of FIG. 4 to assume a position corresponding to that illustrated in FIG. 3.

With reference now to the third embodiment shown in FIG. 5 it will be evident that the box, generally stated, is denoted by the numeral 76 and comprises a main backwall 78, vertical sidewalls 80, the lower end portions of the sidewalls being provided with turned-in horizontal narrow limit stop flanges 82. The hingedly mounted openable and closable bottom or end wall here is denoted by the numeral 84 and is provided with transverse end flanges 86 having apertures (not detailed) to accommodate the screw-threaded headed fastening means 88. The knockout hole is denoted at 90 and serves in the manner illustrated with greater particularity in FIG. 2. The lengthwise or longitudinal inward flange 92 is provided with an opening 94 to accommodate an attaching and hinging hook 96 which is struck out from the wall 78 and leaves an opening as at 98.

It will be evident from the disclosure that there can be one hingedly mounted or openable and closable end wall or upper and lower walls as illustrated in FIGS. 1 and 2 in particular. Either the top or bottom wall of the box can be removed or pivoted to a position to enable free access to the space between an exterior wall and an interior wall to facilitate the connection of wiring to the junction box without disturbing the interior wall as is believed to be evident.

The structure illustrated in FIG. 5 is also well adapted to permit the end panel 84 to be completely detached and removed. This can be accomplished by leaving the female hook 96 spaced from the wall 78 sufficiently to enable the rod or flange 92 to move vertically therethrough. This can be quite readily accomplished in the field by using a screwdriver or the like to force the free end of hook 96 away from wall 78.

It is also evident that a box constructed as herein shown and described will appreciably help an electrician in rewiring or replacing a panel, junction or other type box of a type which is built-in or sealed-in on all sides. The adaptation is such that it can be installed in new buildings or as a replacement-type box. The electrician will have unobstructed access to greatly assist in installing new bushings and wires and will not have to cut into the walls. It follows that the invention well serves the purposes for which it has been devised.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. An electrician's panel box comprising a box having an open front and embodying a backwall provided along vertical edges with forwardly laterally projecting spaced parallel sidewalls, and correspondingly projecting top and bottom end walls, said end walls being movably mounted and retractable to assume a retracted out-of-the-way position within the confines of the receptacle portion of the box whenever necessary or desired, said sidewalls being provided at their respective end portions with lateral turned-in flanges, the flanges at said respective end portions being in a common plane, relatively narrow, defining a cable accommodating access opening between themselves and also providing seating abutments for coacting end portions of said end walls, whereby said end walls span the space between and are normally seated on the coacting abutments and provide openable and closable closures for said access opening, said end walls being provided with selectively usable knockout plugs, and fastening means for said end walls, said fastening means being adjacent and readily accessible by way of said open front, each end wall being hingedly supported and swingably mounted on and between said sidewalls.

2. The electrician's box defined in and according to claim 1, and wherein said end walls are provided at transverse ends with lateral flanges having movable wiping contact with interior surfaces of said sidewalls, said sidewalls having headed end wall mounting and hinging pins and said lateral flanges having elongated slots slidingly and hingedly mounted on their respectively cooperable headed pins.

3. The electrician's box defined in and according to claim 1, and wherein said end walls are marginally provided with transverse and longitudinal flanges, said longitudinal flanges being proximal to, parallel with and hingedly mounted on an interior surface of said backwall.

4. The electrician's box defined in and according to claim 1, and wherein one end wall is marginally provided with transverse end flanges and an intervening longitudinal flange, the latter flange having at least one mounting and hinging slot, a coacting portion of the lower part of said backwall having a struck-out end wall mounting hook and said hook being operatively connected with said mounting and hinging slot.

5. An electrician's box comprising a box having an open front and embodying a backwall provided along vertical edges with forwardly laterally projecting spaced parallel sidewalls, and correspondingly projecting top and bottom end walls, certain of said walls having normally intact selectively usable knockout plugs which provide openings for passage of insertable and removable current-conducting cables or, alternatively, to accommodatingly receive and mount cable-adapting bushings or fittings, said top and bottom end walls each having marginal transverse flanges and a longitudinal flange disposed between and oriented with said transverse flanges, means hingedly mounting said end walls between the respectively cooperable interior surfaces of the back- and sidewalls of said box, said sidewalls being provided at their respective upper and lower ends with paired lateral turned-in flanges coacting in oriented relationship, said paired turned-in flanges being disposed and cooperating in a common plane, being relatively narrow, defining a cable-accommodating and access opening between themselves and, in addition, providing prescribed limit stops and seating abutments for coacting transverse end portions of said top and bottom end walls, the top and bottom end walls spanning the space between coacting portions of the sidewalls and being seated on their respectively cooperating abutments and providing manually openable and closable closures.

6. The electrician's box defined in and according to claim 5, and, in combination, fastening means for said end walls, said fastening means being cooperable with the transverse flanges and sidewalls and being located adjacent and being readily accessible for use by way of said open front.